United States Patent [19]

Larralde et al.

[11] E Re. 29,564

[45] Reissued Mar. 7, 1978

[54] HYDRAULIC MOTION COMPENSATING APPARATUS

[75] Inventors: Edward Larralde, Santa Barbara; Glen Robinson, Oak View, both of Calif.

[73] Assignee: Vetco Offshore Industries, Inc., Ventura, Calif.

[21] Appl. No.: 609,367

[22] Filed: Sep. 2, 1975

Related U.S. Patent Documents

Reissue of:

[64] Patent No.: 3,841,607
Issued: Oct. 15, 1974
Appl. No.: 274,880
Filed: Jul. 25, 1972

[51] Int. Cl.[2] ..... B66D 1/48

[52] U.S. Cl. ..... 254/172; 92/26; 175/5; 188/67

[58] Field of Search ..... 254/172, 173, 189, 139; 175/5; 187/26, 17; 166/.5; 188/67; 92/24, 26, 108, 109, 110

[56] References Cited

U.S. PATENT DOCUMENTS

| | | | |
|---|---|---|---|
| 215,985 | 5/1879 | Snowden | 187/26 X |
| 2,565,730 | 8/1951 | Johnston et al. | 92/108 X |
| 2,851,995 | 9/1958 | Westcott | 92/26 |
| 3,100,630 | 8/1963 | Kummel | 175/5 X |
| 3,146,680 | 9/1964 | Hutter et al. | 92/108 X |
| 3,399,603 | 9/1968 | Cagle | 92/110 X |
| 3,678,805 | 7/1972 | Weyman | 92/110 X |
| 3,687,205 | 8/1972 | Mori | 175/5 X |

*Primary Examiner*—Robert W. Saifer
*Assistant Examiner*—James L. Rowland

[57] ABSTRACT

A compensating apparatus is suspended from a divided crown block mounted on a derrick of a floating drilling barge, the compensating apparatus including a single cylinder extending vertically between and carrying divided travelling block sheaves on opposite sides thereof, with drawwork lines passing over the divided crown block sheaves and divided travelling block sheaves, and with the upper portion of the cylinder extending between such lines and adapted to move upwardly between the crown block sheaves without interference. A piston structure, forming part of the compensating apparatus, is slidable in the cylinder, being connected to a hook, or the like, from which a running string, such as a drilling string, is suspended extends into an underlying well bore, liquid under pressure in the cylinder acting on the piston structure to support part or all of the weight of the running string. The piston structure and cylinder can be locked together mechanically when in a fully contracted condition to render the compensating apparatus ineffective.

25 Claims, 7 Drawing Figures

HYDRAULIC MOTION COMPENSATING APPARATUS

Matter enclosed in heavy brackets [ ] appears in the original patent but forms no part of this reissue specification; matter printed in italics indicates the additions made by reissue.

The present invention relates to apparatus for controlling the stress in a running string, and more particularly to apparatus used on or in connection with a floating vessel or barge for maintaining the strain in a running string, such as a pipe string, substantially constant while being used in the performance of diverse functions in a subaqueous well bore, such as drilling and completion operations therein, despite vertical movement of the vessel while such operations are being performed.

It has been proposed to provide a compensating apparatus between the travelling block and hook of a well bore ring mounted on a vessel floating in a body of water and used in drilling a subaqueous well bore, or performing other operations therein, to maintain the stress in a running string, such as a string of drill pipe, used in drilling the well bore underlying the body of water, at a substantially constant value. Such compensating apparatus includes a cylinder supported from the travelling block and a piston slidable therein connected to the hook, a desired liquid pressure being maintained in the cylinder for exerting an upward supporting force on the piston, which supporting force remains substantially constant despite relative telescopic movement between the cylinder and piston portions of the compensating apparatus, resulting from heaving of the drilling vessel under tide, wind and wave conditions.

In the application of James W. E. Hanes and Edward Larralde, Ser. No. 69,759, filed Sept. 4, 1970, for "Motion Compensating Apparatus," now Pat. No. 3,714,995 it has been proposed to avoid reduction in the extent of vertical movement available in a derrick mounted on the floating vessel, as a result of interposing a compensating apparatus between the travelling block and hook. The length added between the travelling block and hook materially lessens the available maximum travel of the drawbacks or hoisting apparatus, requiring the raising and lowering of shorter stands of drill pipe in the well bore, which thereby increases the time required in making a round trip of the pipe in the well bore. In U.S. Pat. No. 3,714,995, significant height saving advantages have been realized when used with standard crown blocks from which the travelling block is suspended by the drawworks lines. Such height advantages result from employing a pair of cylinders and pistons which straddle or overlap the travelling block, such pair of cylinders and pistons of necessity being eccentric with respect to the center line or axis of the travelling block and hook suspended therebelow, which introduces a bending or binding tendency in the compensating apparatus.

By virtue of the present invention, a compensating apparatus is provided which is so related to the travelling block and hook as to provide for an increase in the maximum stroke of the compensating apparatus without adversely affecting the required height of the derrick.

A further objective of the present invention is to provide a divided crown block, with a single compensating cylinder and associated piston suspended therefrom which will be concentrically disposed with respect to the hook therebelow, in order that the mass of the apparatus and the forces acting thereon are applied in a concentric manner, thereby eliminating any tendency for bending, binding or seizing to occur in parts of the apparatus, and also minimizing wear of the seals and bearings embodied in the apparatus.

Yet a further object of the invention is to employ the cylinder of the compensating apparatus as a portion of the travelling block itself, as by mounting the sheaves of the travelling block on opposite sides of the cylinder, this arrangement being employed in connection with a divided crown block, the divided or split crown block having a gap therebetween into which the cylinder can move, thereby resulting in increase in the stroke or travel of the apparatus.

A further object of the invention is to provide a lock device between the cylinder and piston portions of the compensating apparatus which is concentrically disposed with respect to the cylinder and piston portions of the apparatus, enabling the compensating apparatus to be rendered inoperative during "round tripping" of the drill pipe, or the like, suspended from the apparatus, the lock being operative upon full telescopic or contracted movement of the piston structure within the cylinder. The locking together of the travelling block and hook, and their release from one another, can be effected from a remote point under the control of the operator.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

REFERRING TO THE DRAWINGS

Figure 2:
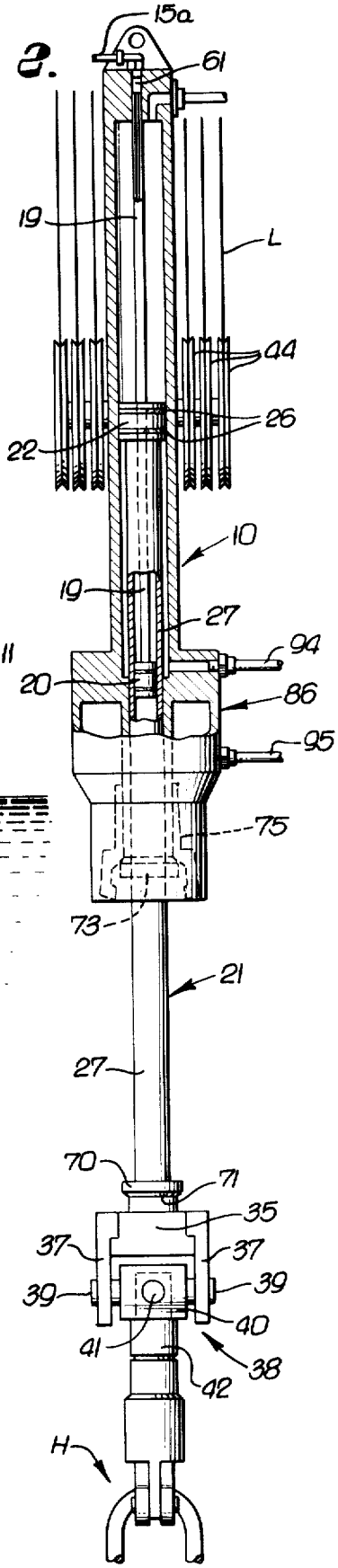
FIG. 2 is a diagrammatic, enlarged view, parts being shown in section, of the compensating apparatus illustrated in FIG. 1.
Figure 3A:
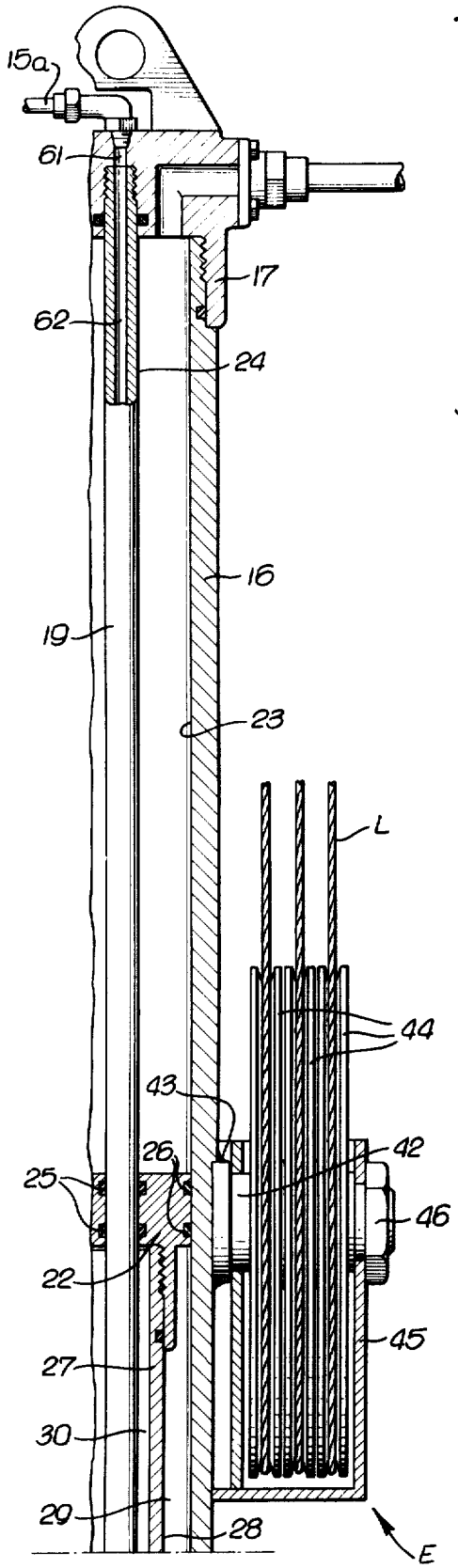
Figure 3B:
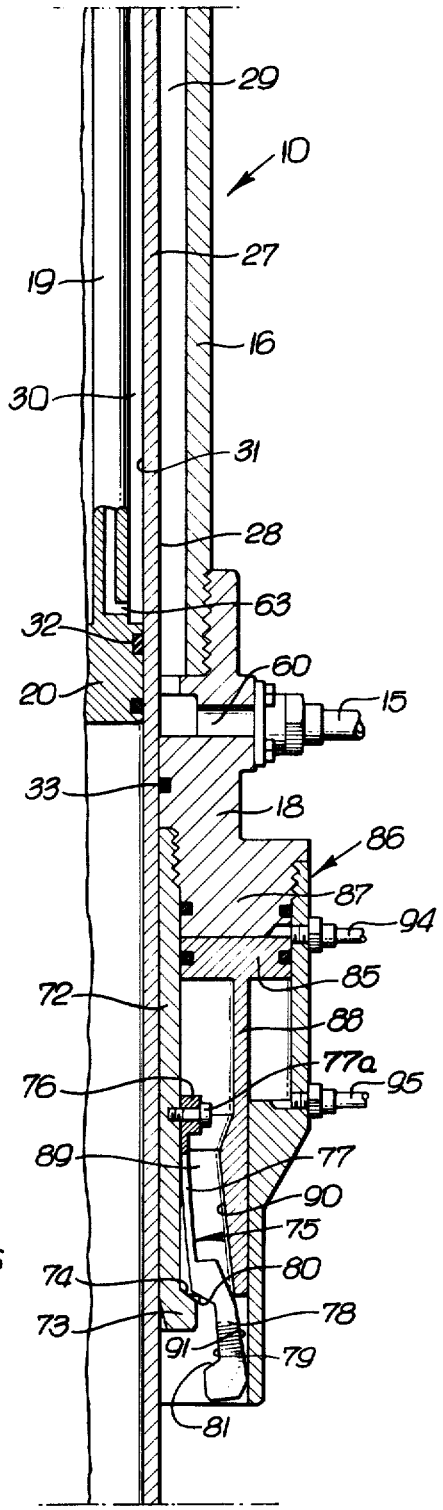
Figure 3C:
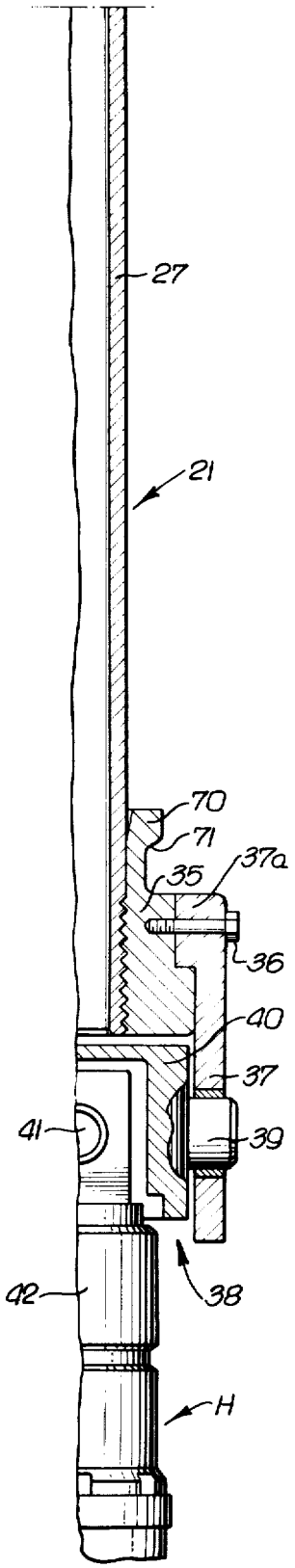
Figure 4A:
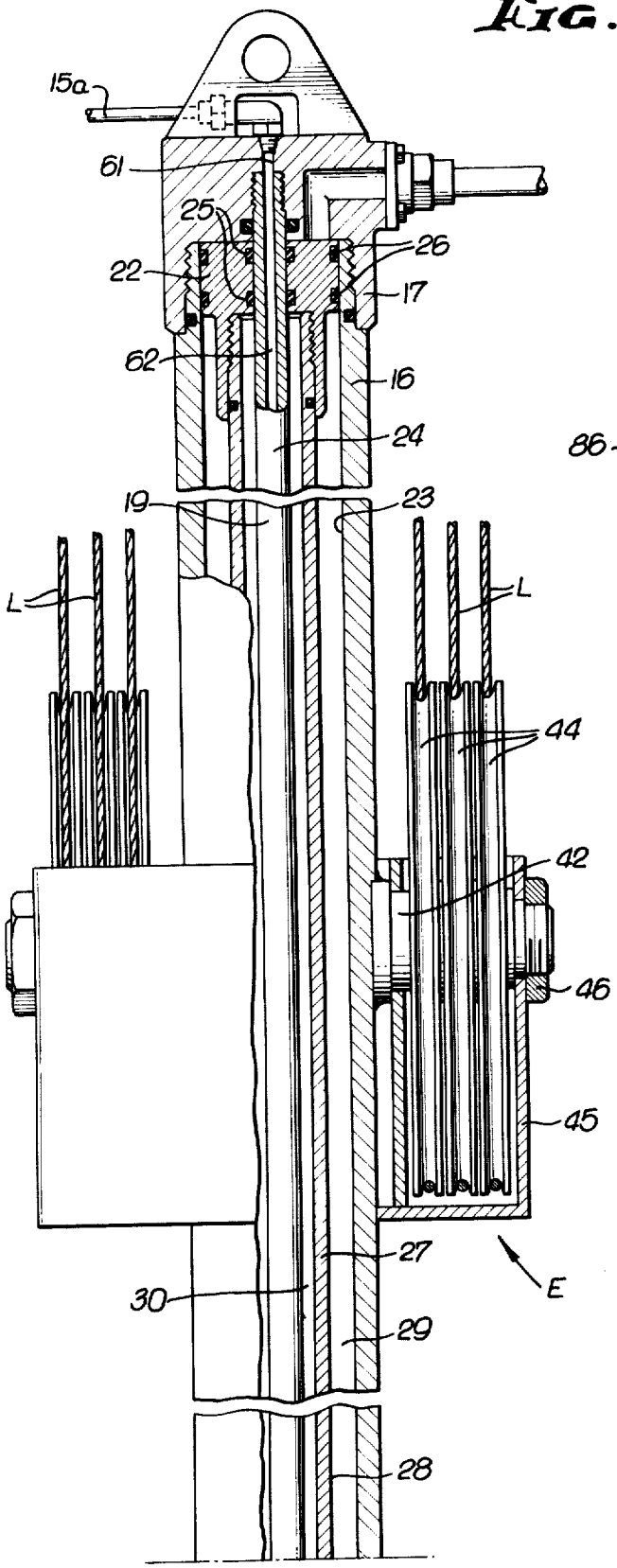
Figure 4B:
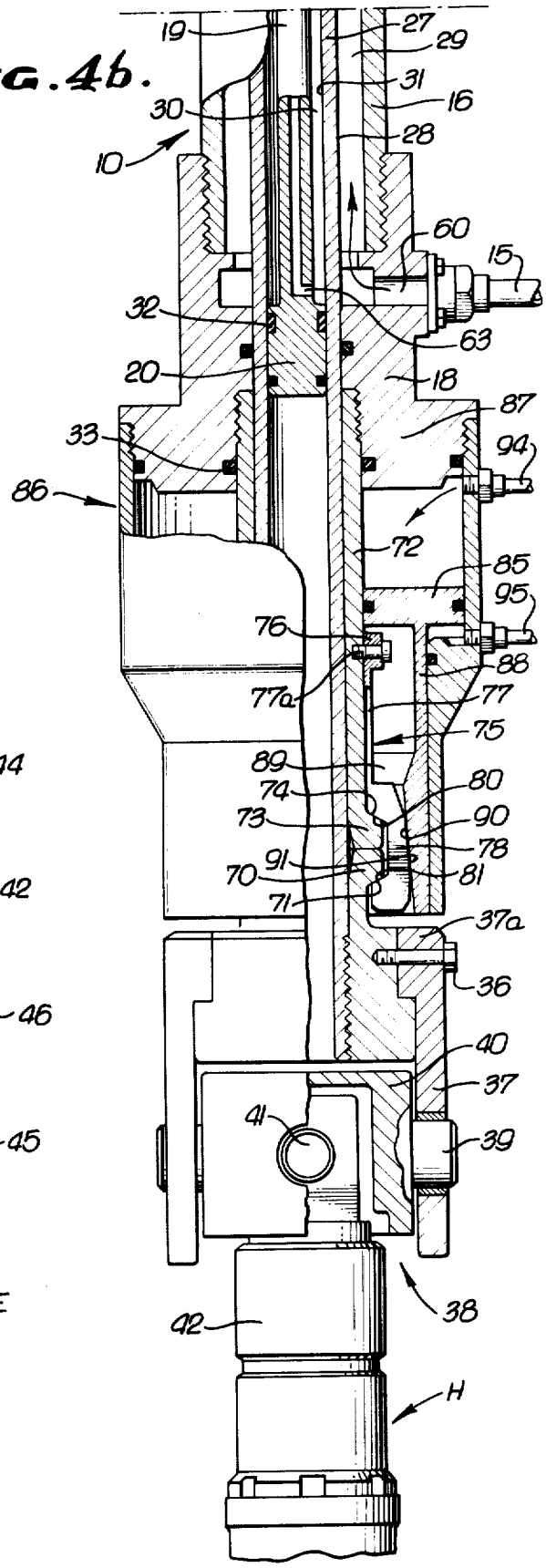

FIGS. 3a, 3b and 3c together constitute an enlarged quarter sectional view, parts being shown in elevation, of the apparatus disclosed in FIG. 2, FIGS. 3b and 3c being lower continuations of FIGS. 3a and 3b, respectively; and FIGS. 4a and 4b together constitute an enlarged longitudinal section of the apparatus disclosed in FIGS. 3a, 3b and 3c, parts being illustrated in elevation, disclosing the compensating apparatus fully contracted and locked in an inoperative position, FIG. 4b, being a lower continuation of FIG. 4a.

An apparatus is illustrated in the drawings in connection with the drilling of a vertical well bore W from a subaqueous floor F above which a drilling barge B, or other floating vessel, is located, the barge being suitably anchored against lateral displacement for the purpose of holding a drilling string S in centered relation with respect to the well bore. A drill bit A is secured to the lower end of the drill string, such as a string of drill pipe *or drill* casing, the upper or kelly portion K of the drill string passing through the usual rotary table T rotated by a suitable drive mechanism (not shown). The upper end of the kelly is secured to a swivel C, which is, in turn, suspended from a hook H connected to the lower portion of a motion compensating apparatus D operatively connected to a travelling block structure E suspended from a crown block structure M, mounted on the upper portion of the derrick N, through the use of the usual lines L connected to a drawworks P mounted on the drilling barge, the drawworks permitting the drill string S to lower as the well bore W is cut by the bit A.

A mudline R is connected to the swivel C for the purpose of pumping drilling mud, or the like, down the drill string S for discharge from the bit A, for the purpose of removing the cuttings produced by the latter. While the drill bit A is rotated by the drill string S, appropriate drilling weight is imposed thereon. Usually, the drilling weight is provided by a suitable length of drill collars disposed in the lower portion of the drill string immediately above the drill bit, the drill string above the drill collars being maintained in tension by the drawworks P, lines L and compensating apparatus D.

Figure 1:
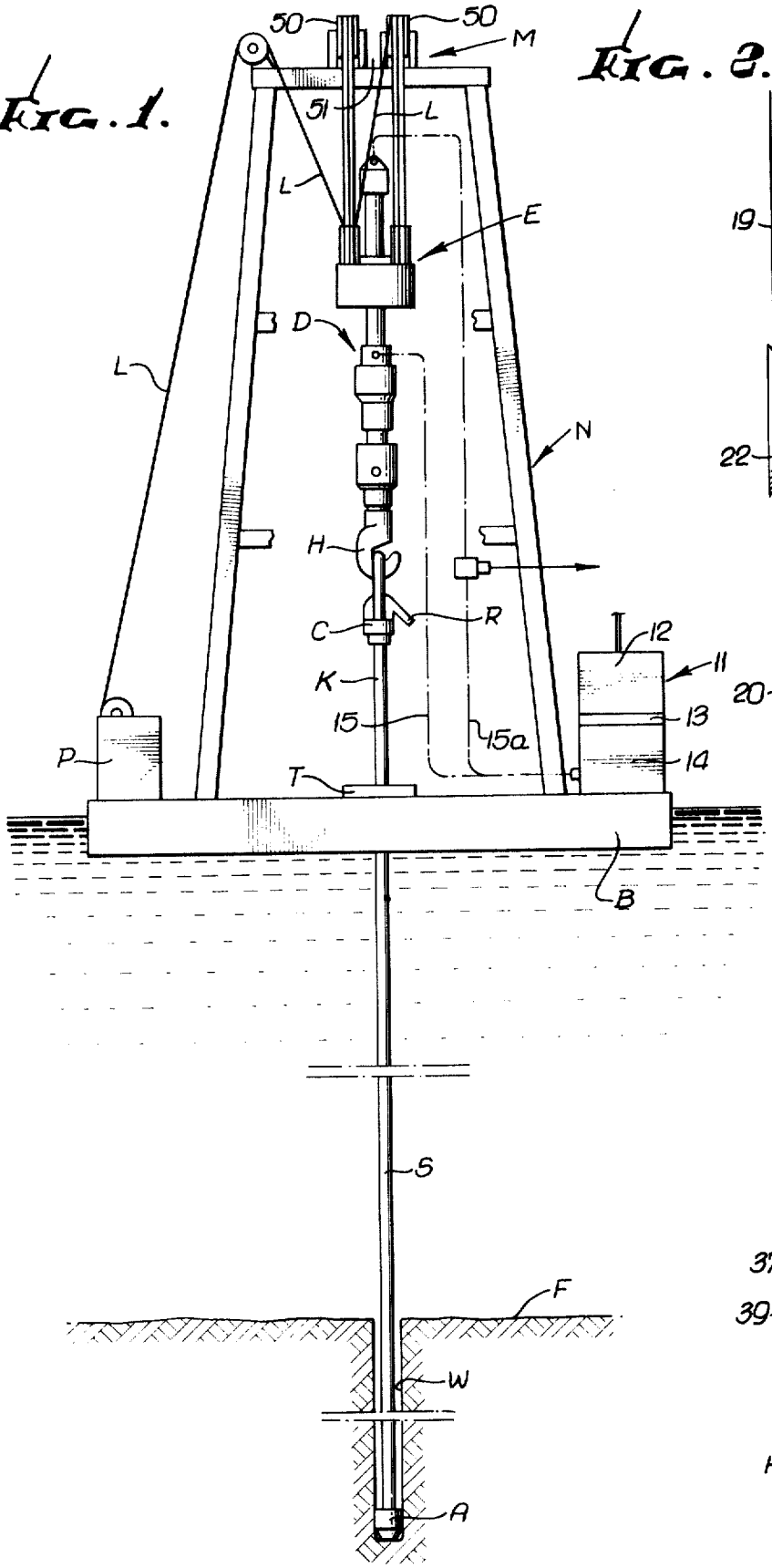
FIG. 1 is a diagrammatic view of an apparatus embodying the invention, illustrated in connection with a rig mounted on a floating vessel for drilling a well bore underlying a body of water.

The compensating apparatus D permits the floating vessel B and the mechanism carried thereby to shift vertically relative to the well bore W, without appreciably modifying the stress in the drill string S, and, therefore, the drilling weight imposed on the drill bit A. Through maintenance of liquid pressure in the compensating apparatus, the tension or strain in the drill string S is maintained substantially constant at a selected value, despite the heaving of the floating vessel in the body of water. A system for maintaining pressure of the liquid in the cylinder 10 of the compensating apparatus at a selected constant value includes an accumulator arrangement 11, disclosed diagrammatically in FIG. 1, in which the pressure of a gas 12 in the accumulator is transferred through a piston 13 to a liquid medium 14 in the accumulator, and through the lines 15, 15a to the cylinder of the compensating apparatus. One such system is illustrated in the application of Edward Larralde, Ser. No. 222,919, filed Feb. 2, 1972, for "Variable Rate Hydraulic-Pneumatic Weight Control and Compensating Apparatus."

As specifically shown, the compensating apparatus includes the cylinder structure 10, embodying an elongate outer cylinder sleeve 16 threadedly connected at its upper end to an upper cylinder head 17, and at its lower end to a lower cylinder head 18. Disposed within the outer cylinder sleeve 16 is a coaxial inner cylinder sleeve 19 threadedly secured to the upper head 17 and terminating in a lower head 20. A piston structure 21 is shiftable longitudinally along both inner and outer cylinder sleeves 19, 16, the structure including an upper annular piston 22 slidably sealing against the inner wall 23 of the outer sleeve 16 and the outer wall 24 of the inner sleeve, leakage between the piston and sleeves being prevented by suitable inner and outer seal rings 25, 26 mounted on the piston and sealingly engaged with the outer and inner walls 24, 23. This piston is threadedly or otherwise suitably secured to a tubular piston rod 27, the outer periphery 28 of which is spaced laterally from the inner cylinder wall 23, to define an annular cylinder space 29 therebetween, the piston rod also being spaced laterally from the inner sleeve 19 to provide an annular space 30 therebetween. The inner head 20 is in slidable relation to the inner wall 31 of the tubular piston rod, leakage of fluid therebetween being prevented by suitable seal rings 32 on the inner head slidably and sealingly engaging against the inner wall of the tubular piston rod. The lower cylinder head 18 carries a suitable rod seal 33 sealingly engaging against the periphery 28 of the piston rod 27.

The piston rod 27 extends through the lower cylinder head 18 and has its lower portion threadedly secured to a lower lock member 35 suitably secured, as by means of a plurality of screws 36, to an adapter 37 having an upper inner flange 37a resting upon an outer flange 35a of the lock member 35 and forming part of a gimbal 38 secured to the lower hook H, which depends therefrom and which is coaxially arranged with respect to the cylinder sleeves 16, 19 and the piston structure 21. The gimbal includes trunnions 39 extending from opposite sides of a cross-head 40, and which are pivotally mounted in the adapter 37, the cross-head having a transverse pin 41 connected to the upper portion 42 of the hook and lying in the same plane as the trunnions 39, being disposed 90 degrees with respect thereto. It is apparent that the hook H can pivot about the axis of the transverse pin 41 and also about the axis of the trunnions 39, which provides for a universal movement of the hook with respect to the piston rod 27.

The travelling block structure E is actually integrated into the cylinder 10. Thus, the cylinder sleeve 16 has trunnions or bearing supports 42 suitably secured, as by use of welding material 43, on opposite sides of the cylinder substantially below the upper cylinder head 17, there being a plurality of sheaves 44 rotatably mounted on each of said trunnions through suitable intervening roller or other bearings (not shown), the bearings and a housing 45 enclosing the lower portion of the sheaves being retained on the trunnions 42 by a suitable nut 46 threaded on the outer portion of each trunnion.

It is apparent that the travelling block E is split or divided, being arranged on opposite sides of the cylinder 10, which permits the drawworks lines L to pass successfully over such sheaves 44 and corresponding sheaves 50 forming a part of the crown block M, the crown block being split or divided and providing a gap 51 between its two portions. It is apparent that the crown block is suitably supported on the upper end of the derrick N.

The travelling block E and the compensator apparatus D secured thereto can be elevated by the drawworks P to a maximum position in which the split travelling block sheaves 44 are disposed closely adjacent to the crown block sheaves 50, the cylinder 10 entering the gap or space 51 between the crown block sheaves. Accordingly, a maximum range of travel is achievable, offsetting the length added to the apparatus by the compensator portion D of the apparatus disposed below the sheaves 44 and intervening between the sheaves 44 and the hook H.

The liquid under pressure from the accumulator 11 can pass into and out of the annular cylinder space 29 through an inlet and outlet port 60 in the lower cylinder head to which one of the liquid lines 15 is suitably connected. The liquid under pressure in such annular cylinder space acts in an upward direction over the annular piston 22 across the annular area of the cylinder space 29 to exert an upward force on the piston, the tubular piston rod 27 and the hook H and other apparatus suspended therefrom. Similarly, the liquid under pressure can pass through the line 15a connected to an inlet and outlet port 61 in the upper cylinder head 17, and through a central passage 62 in the inner cylinder sleeve 19 which communicates through a lower port 63, immediately above the inner head 20, with the annular space 30 between the outer wall 24 of the inner cylinder sleeve and the tubular piston rod 27, this liquid under pressure also acting in an upward direction over the inner portion of the annular piston 22 and assisting in the supporting of the piston rod 27 and the mechanism suspended therefrom.

As the drilling barge or vessel heaves in the water, the liquid under pressure will pass into and out of the annular cylinder spaces 29, 30, permitting longitudinal travel of the outer and inner cylinders 16, 19 along the piston rod 27 without substantially affecting the pressure of the liquid in the cylinder spaces 29, 30, which continues to exert a substantially constant upward force on the piston 22 and the piston rod depending therefrom, the liquid passing into and from the accumulator 11, with the pressure of the gas 12 maintaining the substantially constant unit pressure in the liquid 14. Thus, a constant stress or tension is maintained on the drilling string S, without varying its relative position within the well bore W as the drilling barge B and cylinder 10 move vertically under the action of wind, wave and tide.

At times, it is desirable for the motion compensator apparatus D to be rendered inoperative, as, for example, during withdrawal of the drill pipe S, or its relowering from the drilling barge into the well bore. With the apparatus illustrated, the cylinder 10 and piston structure 21 are mechanically locked together when the piston 22 occupies its uppermost position within the cylinder 10; in effect, securing the hook H in a predetermined position with respect to the travelling block E so that they operate as a unit during the raising and lowering of the travelling block. As disclosed, the lower lock member 35 secured to the piston rod 27 has an external lock flange 70 thereon provided with a downwardly facing lock surface 71. The lower cylinder head 18 has an upper lock member 72 threadedly secured thereto and depending therefrom, and through which the piston rod 27 is slidable, which also has an upper external lock flange 73 thereon provided with an upwardly tapering lock surface 74, which are oppositely disposed with respect to the lower lock flange 70 and its lock surface 71. A collet type of lock device 75 is carried by the upper lock member 72, this lock device including an upper head 76 suitably secured to the upper lock member 72 by means of a plurality of screws 77a. Integral with and depending from the head 76 are a plurality of circumferentially arranged spring-like arms 77 terminating in lock dogs 78, each dog having an inner recess 79 in which the upper and lower lock flanges 73, 70 can be received when they are disposed adjacent to one another. The dogs 78 have upper lock surfaces 80 and lower lock surfaces 81 spaced from one another and defining the upper and lower ends of the recesses 79, and which conform to the upper and lower lock surfaces 74, 71 on the flanges 73, 70.

Normally, the spring arms 77 shift the lock dogs 78 laterally outwardly into a position permitting upward movement of the lower lock flange 70 through the lower ends of the lock dogs, and into a position substantially contacting the upper lock flange 73, as illustrated in FIG. 4b. With the lock flanges in such abutting or adjacent position, the lock dogs 78 can be shifted inwardly to a position in which the upper and lower lock dog surfaces 80, 81 engage the companion lock surfaces 74, 71 on the lock flanges 73, 70, thereby securing the piston 21 and cylinder 10 to one another, preventing their relative longitudinal movement.

As specifically disclosed, the actuation of the lock device 75 may be effected from a remote point. Thus, an annular piston 85 is provided within a lock cylinder 86, the upper portion of which is threadedly secured to the lower cylinder head 18, which actually constitutes an upper head 87 of the lock cylinder. The annular piston is disposed in the space between the upper lock member 72 and the cylinder 86, an actuator sleeve 88 integral with and depending from this piston 85 being provided which extends downwardly within a lower cylinder portion 89 of substantially lesser internal diameter than the upper portion of the cylinder 86, and in which the sleeve 88 is slidable. The spring arms 77 and lock dogs 78 are disposed within the lower cylinder portion 89. The lower portion of the sleeve is constituted as an internal cam 90 having its inner surface inclined in a downward and outward direction and adapted to engage companion cam surfaces 91 on the lock dogs, for the purpose of shifting the dogs 78 laterally inwardly upon downward movement of the piston 85 and its sleeve 88 within the cylinder 86. Such downward movement occurs as a result of feeding hydraulic fluid through a line 94 connected to the upper portion of the cylinder 86 and adapted to direct liquid under pressure into the cylinder above the piston 85, for the purpose of forcing the piston 85 and its cam 90 downwardly when the lower lock member 35 abuts the upper lock member 72, causing the cam to shift the lock dogs 78 inwardly to the locking position illustrated in FIG. 4b. The angle of taper of the cam surface 90 and the companion surfaces 91 on the dogs is relatively small, actually constituting a self-locking angle, such that the dogs 78 are retained in a position locking the piston structure 21 and cylinder structure 10 against longitudinal movement with respect to each other in the absence of fluid pressure in the cylinder 86 above the lock piston 85.

In the event the lock is to be released, liquid under pressure is forced through a suitable line 95 communicating with the cylinder 86 below the piston when it is in its lower position, this fluid acting in an upward direction on the piston, to elevate the piston 85 and its associated sleeve 88 within the cylinder 86 and relative to the lock dogs 78, placing the piston and sleeve in the position illustrated in FIG. 3b. When the cam surface 90 is out of [arrangement] *engagement* with the lock dogs 78, the spring arms 77 will inherently expand to their outer position, permitting the piston rod 27 to move freely within the cylinder 10. If this were not to occur, a relative downward force exerted on the piston rod 27, as by the weight suspended therefrom, will cause its tapered lock surface 71 to force the lock dogs 78 to their lateral outward or unlocked position illustrated in FIG. 3b.

By virtue of the apparatus described, a compensating apparatus has been provided that permits a desired maximum movement of the travelling block without requiring an undue derrick height. The divided crown block M and the straddling relationship between the cylinder 10 and the sheaves 44 permit the apparatus to be elevated within the derrick to such an extent that the full required elevation of the drilling string within the derrick can occur, in essentially the same manner as if a compensating apparatus were not present. The dividing of the crown block permits the cylinder 10 to pass between its two portions without interference, enabling a greater elevation of the travelling block to occur, as compared to the provision of an unsplit or undivided crown block. Even in the absence of a split crown block, the required travel of the travelling block E can still occur without interference by the compensator apparatus D, because of the straddled or overlapping relation between the split travelling block and the compensator cylinder 10. The provision of a single compensator cylinder and a single piston operating therein, related in a concentric manner to the apparatus suspended therefrom, results in forces being applied to the several parts in a concentric manner, thus eliminating bending, binding or seizing tendencies on the parts, as well as minimizing loads on seals and bearing surfaces. The concentric locking device enables the compensator portion of the apparatus to be rendered inoperative, permitting joint movement of the travelling block E and the hook H to the same extent as if the compensating apparatus D were not present. With the apparatus in a locked condition, there is no necessity for retaining liquid under pressure in the cylinder 10. The concentric locking device is simpler than the type of locking device illustrated in U.S. Pat. No. 3,714,995, the ease of effecting locking and unlocking being greatly increased. Such selective locking or unlocking of the travelling block and hook can be effected from a remote point under the control of the operator.

We claim:

1. An apparatus for maintaining a predetermined stress in a running string disposed in a well bore and which is supported by a rig, including a derrick and a suspension mechanism supported from the upper portion of the derrick: comprising a travelling block structure adapted to form part of the suspension mechanism; a hook structure adapted to support the running string therebelow; a motion compensating apparatus disposed between and connected to said block structure and hook structure; said motion compensating apparatus comprising cylinder means coaxial of said hook structure; piston means slidable in said cylinder means and connected to said hook structure; said travelling block structure being split and fixedly mounted to said cylinder means on opposite sides of said cylinder means substantially below the upper end of said cylinder means and with said cylinder means disposed between said split block structure; and means for maintaining a fluid medium under pressure in said cylinder means for exerting an upward force on said piston means as said piston means and cylinder means move longitudinally relative to one another in both longitudinal directions.

2. An apparatus as defined in claim 1; said block structure comprising one or more sheaves rotatably mounted on said cylinder means at one side thereof and one or more sheaves rotatably mounted on said cylinder means at the opposite side thereof.

3. An apparatus as defined in claim 1; said block structure comprising one or more sheaves rotatably mounted on said cylinder means at one side thereof and one or more sheaves rotatably mounted on said cylinder means at the opposite side thereof; said cylinder means projecting upwardly beyond said sheaves.

4. An apparatus as defined in claim 1; and means for releasably locking said piston means and cylinder means to each other when said piston means is substantially fully telescoped within said cylinder means to prevent relative longitudinal movement between said piston means and cylinder means.

5. An apparatus as defined in claim 1; collet means for releasably locking said piston means and cylinder means to each other when said piston means is substantially fully telescoped within said cylinder means to prevent relative longitudinal movement between said piston means and cylinder means; and means movable longitudinally along one of said cylinder means and piston means for selectively shifting said collet means to locking or unlocking position.

6. An apparatus as defined in claim 1; collet means for releasably locking said piston means and cylinder means to each other when said piston means is substantially fully telescoped within said cylinder means to prevent relative longitudinal movement between said piston means and cylinder means; and hydraulically operable means movable longitudinally along said cylinder means for selectively shifting said collet means to locking or unlocking position.

7. An apparatus as defined in claim 1; said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealed relation to said outer and inner members; and means for directing said fluid medium under pressure into the space between said piston rod and inner wall of said outer member for action upon said piston; said piston rod being laterally spaced from said inner member to provide a second annular space therebetween; and means for directing said fluid medium under pressure into said second annular space for action upon said piston.

8. An apparatus as defined in claim 1; said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealed relation to said outer and inner members; and means for directing said fluid medium under pressure into the space between said piston rod and inner wall of said outer member for action upon said piston; and means for releasably locking said piston rod and outer member to each other when said piston and piston rod are substantially fully telescoped within said cylinder means to prevent relative longitudinal movement between said piston means and cylinder means.

9. An apparatus as defined in claim 1; said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealed relation to said outer and inner members; and means for directing said fluid medium under pressure into the space between said piston rod and inner wall of said outer member for action upon said piston; collet means for releasably locking said piston rod and outer member to each other when said piston means is substantially fully telescoped within said cylinder means to prevent relative longitudinal movement between said piston means and cylinder means; and means movable longitudinally along said outer member for selectively shifting said collet means to locking or unlocking position.

10. An apparatus for maintaining a predetermined stress in a running string disposed in a well bore and which is supported by a rig, including a derrick: comprising a suspension mechanism including a split crown block structure adapted to be supported from the upper portion of the derrick; a travelling block structure below said crown block structure and suspended therefrom by lines passing around both structures; a hook structure adapted to support the running string therebelow; a motion compensating apparatus disposed between and connected to said travelling block structure and hook structure; said motion compensating apparatus comprising cylinder means coaxial of said hook structure; piston means slidable in said cylinder means and connected to said hook structure; said travelling block structure being split and fixedly mounted to said cylinder means on opposite sides of said cylinder means substantially below the upper end of said cylinder means and with said cylinder means disposed between said split block structure; and means for maintaining a fluid medium under pressure in said cylinder means for exerting an upward force on said piston means as said piston means and cylinder means move longitudinally relative to one another in both longitudinal directions.

11. An apparatus as defined in claim 10, said crown block structure comprising sets of sheaves laterally spaced from each other; said travelling block structure comprising one or more sheaves rotatably mounted on said cylinder means at one side thereof and one or more sheaves rotatably mounted on said cylinder means at the opposite side thereof.

12. An apparatus as defined in claim 10; said crown block structure comprising sets of sheaves laterally spaced from each other; said travelling block structure comprising one or more sheaves rotatably mounted on said cylinder means at one side thereof and one or more sheaves rotatably mounted on said cylinder means at the opposite side thereof; said cylinder means projecting upwardly beyond, said travelling block sheaves and adapted to extend between said sets of sheaves of said crown block structure.

13. An apparatus as defined in claim 10; said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealing relation to said outer and inner members; and means for directing said fluid medium under pressure into the space between said piston rod and inner wall of said outer member for action upon said piston.

14. An apparatus as defined in claim 10; said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealing relation to said outer and inner members; and means for directing said fluid medium under pressure into the space between said piston rod and inner wall of said outer member for action upon said piston; and means for releasably locking said piston rod and outer member to each other when said piston means is substantially fully telescoped within said cylinder means to prevent relative longitudinal movement between said piston means and cylinder means.

15. An apparatus as defined in claim 10, said cylinder means comprising an outer member and an inner member therewithin and secured to said outer member, said inner and outer members being laterally spaced from each other to provide an annular space therebetween in which said piston means is movable; said piston means comprising a piston in said annular space slidably sealing against the inner wall of said outer member and the outer wall of said inner member; said piston means further comprising a piston rod secured to said piston and laterally spaced from said inner wall of said outer member and in slidable sealing relation to said outer and inner members; and means for directing said fluid medium under pressure into the space between said piston rod and inner wall of said outer member for action upon said piston; collet means for releasably locking said piston rod and outer member to each other when said piston means is substantially fully telescoped within said cylinder means to prevent relative longitudinal movement between said piston means and cylinder means; and means movable longitudinally along said outer member for selectively shifting said collet means to locking or unlocking position.

*16. An apparatus useful for maintaining a predetermined stress in a running string positioned in well bore and supported by a rig including suspension mechanism for which the running string is suspended, said apparatus including a travelling block structure adapted to form part of the suspension mechanism, a support structure adapted to support the running string therebelow, a motion compensating apparatus disposed between and connected to said travelling block structure and support structure, said motion compensating apparatus comprising cylinder means coaxial of said support structure, piston means slidable in said cylinder means and connected to said support structure, said travelling block structure being split and fixedly mounted to said cylinder means on opposite sides of said cylinder means substantially below the upper end of said cylinder means and with said cylinder means disposed between said split travelling block structure, and means on said cylinder means for connection to a source of fluid pressure for maintaining a fluid medium under pressure in said cylinder means for exerting an upward force on said piston means as said piston means and cylinder means*

*move longitudinally relative to one another in both longitudinal directions.*

*17. An apparatus as defined in claim 16; said travelling block structure comprising one or more sheaves rotatably mounted on said cylinder means at one side thereof and one or more sheaves rotatably mounted on said cylinder means at the opposite side thereof.*

*18. An apparatus as defined in claim 16; said travelling block structure comprising one or more sheaves rotatably mounted on said cylinder means at one side thereof and one or more sheaves rotatably mounted on said cylinder means at the opposite side thereof, said cylinder means projecting upwardly beyond said sheaves.*

*19. An apparatus as defined in claim 16; and means for releasably locking said piston means and cylinder means to each other when said piston means is substantially fully telescoped within said cylinder means to prevent relative longitudinal movement between said piston means and cylinder means.*

*20. An apparatus as defined in claim 16; said cylinder means comprising an outer member and an inner member therewithin and secured to said outer member, said inner and outer members being laterally spaced from each other to provide an annular space therebetween in which said piston means is movable, said piston means comprising a piston in said annular space slidably sealing against the inner wall of said outer member and the outer wall of said inner member, said piston means further comprising a piston rod secured to said piston and laterally spaced from said inner wall of said outer member and in slidable sealed relation to said outer and inner members, means for directing a fluid medium under pressure into the space between said piston rod and inner wall of said outer member for acting upon said piston, said piston rod being laterally spaced from said inner member to provide a second annular space therebetween, and means for directing said fluid medium under pressure into said second annular space for action upon said piston.*

*21. An apparatus useful for maintaining a predetermined stress in a running string disposed in a well bore and which is supported by a rig which includes a derrick; said apparatus including a suspension mechanism including a split crown block structure adapted to be supported from the upper portion of the derrick, a travelling block structure below said crown block structure and suspended therefrom by lines passing around both structures, a support structure adapted to support the running string therebelow, a motion compensating apparatus disposed between and connected to said travelling block structure and support structure, said motion compensating apparatus comprising cylinder means coaxial of said support structure, piston means slidable in said cylinder means and connected to said support structure, said travelling block structure being split and fixedly mounted to said cylinder means on opposite sides of said cylinder means substantially below the upper end of said cylinder means and with said cylinder means disposed between said split block structure, and means for directing a fluid medium under pressure into said cylinder means for exerting an upward force on said piston means as said piston means and cylinder means move longitudinally relative to one another in both longitudinal directions.*

*22. An apparatus as defined in claim 21; said crown block structure comprising sets of sheaves laterally spaced from each other, said travelling block structure comprising one or moe sheaves rotatably mounted on said cylinder means at one side thereof and one or more sheaves rotatably mounted on said cylinder means at the opposite side thereof.*

*23. An apparatus as defined in claim 21; said crown block structure comprising sets of sheaves laterally spaced from each other, said travelling block structure comprising one or more sheaves rotatably mounted on said cylinder means at one side thereof and one or more sheaves rotatably mounted on said cylinder means at the opposite side thereof, said cylinder means projecting upwardly beyond said travelling block sheaves and adapted to extend between said sets of sheaves of said crown block structure.*

*24. An apparatus as defined in claim 21; said cylinder means comprising an outer member and an inner member therewithin and secured to said outer member, said inner and outer members being laterally spaced from each other to provide an annular space therebetween in which said piston means is movable, said piston means comprising a piston in said annular space slidably sealing against the inner wall of said outer member and the outer wall of said inner member, said piston means further comprising a piston rod secured to said piston and laterally spaced from said inner wall of said outer member and in slidable sealing relation to said outer and inner members, means for directing said fluid medium under pressure into the annular space between said piston rod and inner wall of said outer member for action upon said piston, said piston rod being laterally spaced from said inner member to provide a second annular space therebetween, and means for directing said fluid medium under pressure into said second annular space for action upon said piston.*

*25. On a floating drilling platform of the type having a derrick, an upper crown block assembly having a plurality of sheaves mounted on the derrick, a lower travelling block assembly having a plurality of sheaves, powered cable means interconnecting the travelling block assembly and the crown block assembly, a rotary carrier for supporting the drill string below the travelling block, and a hydraulic heave compensator between the travelling block assembly and the rotary carrier; said crown block being formed with a vertical opening passing between said sheaves and said heave compensator comprising a central cylinder mounted on the travelling block assembly and arranged to pass through said vertical opening while the travelling block is selectively raised by the cable means, a piston in said cylinder having a rod projecting downwardly to said carrier, and coupling means for selectively coupling said carrier to the travelling block assembly when the piston is raised in the cylinder.*

* * * * *